June 24, 1941.  J. E. BLOOMBERG  2,246,662
CUSHION SEAT AND METHOD OF MAKING THE SAME
Filed Jan. 30, 1937  2 Sheets-Sheet 1
FIG. 1.
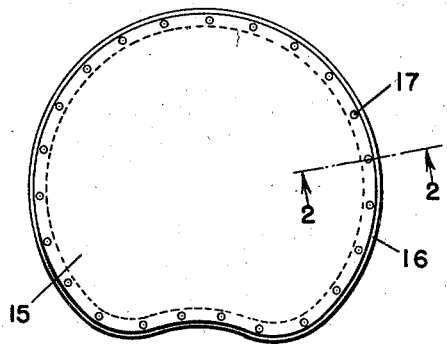
FIG. 2.
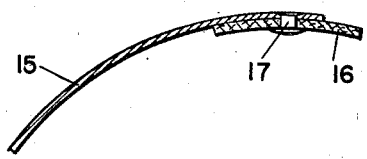
FIG. 3.
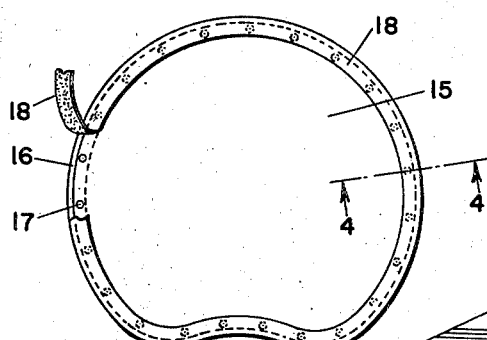
FIG. 4.
FIG. 5.
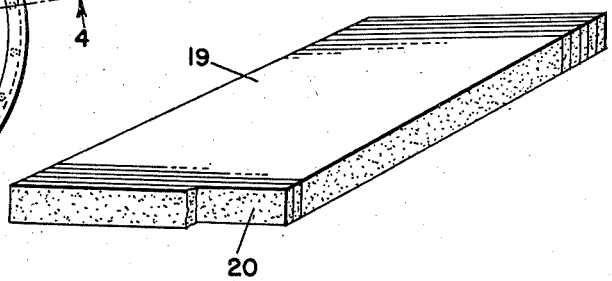
FIG. 7.
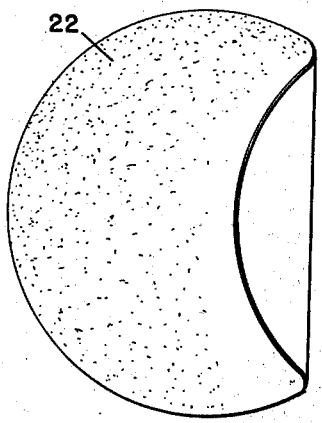
FIG. 6.
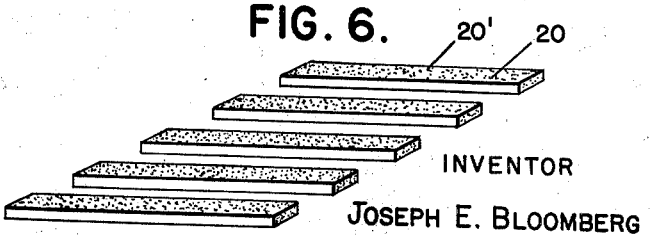
INVENTOR
JOSEPH E. BLOOMBERG
BY
Louis O. French
ATTORNEY June 24, 1941.   J. E. BLOOMBERG   2,246,662
CUSHION SEAT AND METHOD OF MAKING THE SAME
Filed Jan. 30, 1937   2 Sheets-Sheet 2

INVENTOR
JOSEPH E. BLOOMBERG
BY
*Louis O. French*
ATTORNEY

Patented June 24, 1941

2,246,662

UNITED STATES PATENT OFFICE 2,246,662

CUSHION SEAT AND METHOD OF MAKING THE SAME

Joseph E. Bloomberg, Milwaukee, Wis., assignor to Milwaukee Saddlery Company, Milwaukee, Wis., a corporation of Wisconsin Application January 30, 1937, Serial No. 123,140

6 Claims. (Cl. 45—138)

The invention relates to cushion seats and to a method of making the same.

Some seats, such as for tractors and automotive vehicles, are deeply dished or curved to make them comfortable. Such forms of seats cannot be cushioned with a cushioning material, such as a one piece layer of sponge rubber, except at great expense both in the forming of a molded cushion and its subsequent treatment to provide an adhering surface. The object of the present invention is to provide a simple and expeditious method for providing deeply dished metal seats with a cushioning layer of sponge rubber and a flexible covering therefor. More particularly according to the present invention, the sponge rubber in the form of a large slab is cut up into strips or blocks whose thickness is substantially that of the cushioning layer, thus providing exposed pore portions on the top and bottom side of each piece. These pieces are then fitted and cemented onto the metal surface to form a cushioning layer with an adherable top surface to which a covering layer is secured as hereinafter described.

The invention further consists in the several features hereinafter set forth and more particularly defined by claims at the conclusion hereof.

In the drawings:

Fig. 1 is a plan view of a metal seating having a cover fastening strip applied thereto;

Fig. 2 is a detail sectional view taken on the line 2—2 of Fig. 1;

Fig. 3 is a view similar to Fig. 1 with another cover fastening strip applied thereto;

Fig. 4 is a detail sectional view taken on the line 4—4 of Fig. 3;

Fig. 5 is a perspective view of the cushioning material preparatory to forming it into the blocks or strips shown in perspective in Fig. 6;

Fig. 7 is a top view of the top covering, part of which is bent back;

Figure 8:
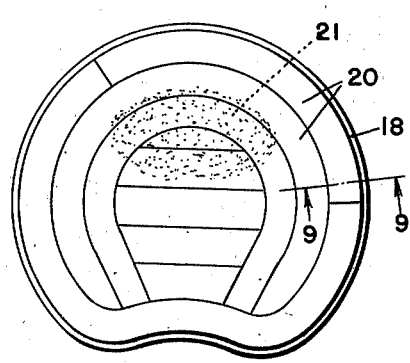
Fig. 8 is a plan view of the seat with the cushioning layer formed therein.

Referring to the drawings, the numeral 15 designates a seat body of stamped sheet metal and consequently having relatively sharp edges and to the edge portion of which an anchor strip 16 of flexible material, preferably of suitable leather or hide, is firmly secured by rivets 17 as shown in Figs. 1 and 2. A wear strip 18 of leather or canvas is also secured to the edge portion of the seat on the opposite side to that of the strip 16 by cementing the same to said seat as shown in Figs. 3 and 4. Before applying the cushioning material to this seat the upper surface of said seat has a coating of naphtha-rubber cement or adhesive applied thereto.

Figure 9:
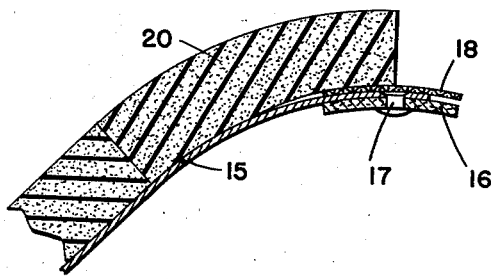
Fig. 9 is a detail sectional view taken on the line 9—9 of Fig. 8.
Figure 10:
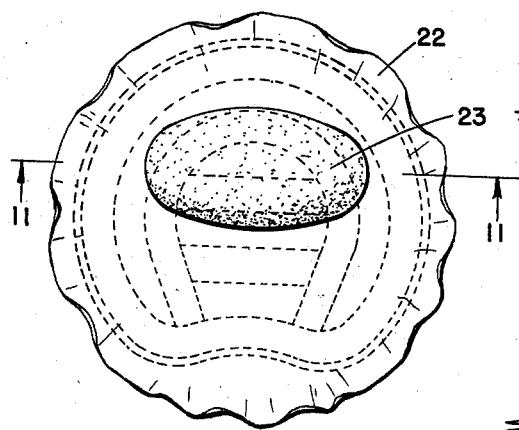
Fig. 10 is a top plan view of the seat with the top covering as initially applied thereto.
Figure 11:
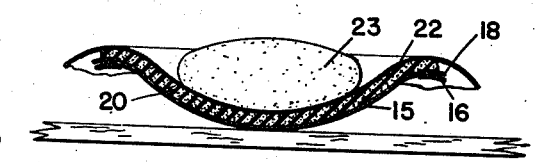
Fig. 11 is a detail sectional view taken on the line 11—11 of Fig. 10.
Figure 12:
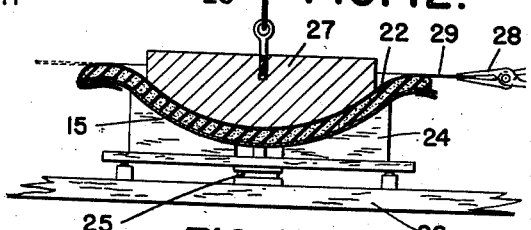
Fig. 12 is a view similar to Fig. 11 showing the seat during the cover applying operation.
Figure 14:
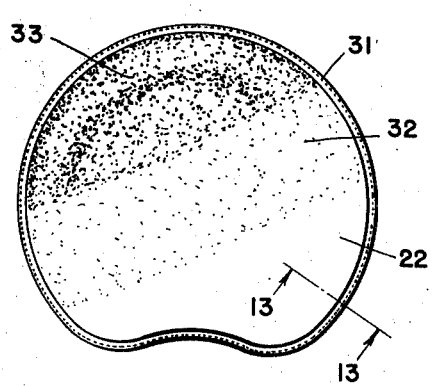
Fig. 14 is a top plan view of the covered seat showing the different coatings applied to the cover.

The cushioning material is sponge rubber, and in its initial condition is in the form of a large block or slab 19 which is cut transversely into a number of strips or blocks 20. Slabs of this character are formed in molds, and while the interior structure thereof is cellular, the outer surfaces are smooth. The thickness of a strip from one cut surface to the other is the thickness of the finished cushion since these cut sides are used to form the top and bottom sides of the cushion and each of these sides have the open pores 20' of the material exposed so that the adhesive applied thereto will readily penetrate the same. These strips are coated on one of their pore-exposed sides with naphtha cement which is allowed to become tacky, and then in this condition the strips are fitted into and applied to the cement surface of the seat 15 as shown in Figs. 8 and 9, it being noted that the seat is deeply dished, as shown in Figs. 11 and 12, and the blocks or strips are fitted into it to best accommodate the curvature of the seat structure. The top surface of the cushioning material at the central part 21 is then given a coating of latex cement, and a flexible cover member 22 preferably a loose woven belting or hose duck or canvas is given a coating of similar material, and its cemented side is initially secured to the coated part 21 of the cushioning layer with the parts held under pressure by a sandbag 23 as shown in Figs. 10 and 11.

When the cemented coating of the cover member 22 has attained the desired tackiness, the seat is put in the fixture shown in Fig. 12.

Figure 13:
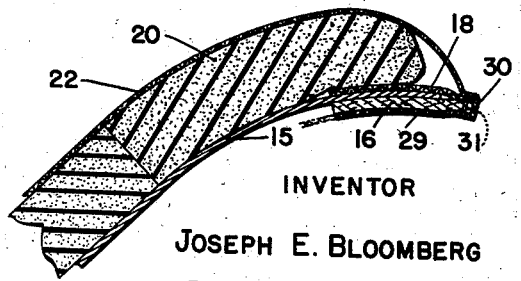
Fig. 13 is a detail sectional view taken on the line 13—13 of Fig. 14.

This fixture includes a base form 24 rotatably mounted at 25 upon a support 26 and shaped to fit the curvature of the seat and a heavy weight 27 also shaped to fit the curvature of the seat and adapted to be moved by a cable or rope 28 associated with a block and tackle not shown. While the covering 22 is being subjected to the heavy pressure of the weight, the operator by gripping the edges of the material with a pliers 28' works it over the edge of the cushion and stretches it and smooths it out under the weight during this operation. The extended edge 29 of the covering is then pulled over the edges of the strips 18 and 16 and cemented to the exposed face of the strip 16 as shown in Fig. 13, and then the bent over portion 30 of said covering and the strips 18 and 16 are secured together by stitching 31.

The covering 22 which is usually an uncolored fabric is then dyed to the desired color by saturating the same by spraying a dyeing solution thereon. After this dyeing solution has dried, the top surface of the covering 22 is coated with a relatively heavy cold vulcanizable latex coating indicated at 32, and after this coating has cured, a waterproof flexible coating 33 of a suitable pyroxylin lacquer is sprayed over the outer surfaces of the seat.

I desire it to be understood that this invention is not to be limited to the details hereinbefore set forth except in so far as such limitations are included in the claims.

What I claim as my invention is:

1. The method of forming a sponge rubber cushion for a dished metal seat body comprising cutting blocks from a slab of sponge rubber, the thickness of said blocks determining the depth of the cushion, fitting together and cementing these blocks in juxtaposition upon the seat body to form a layer of cushioning material with cut surfaces of the blocks adhesively contacted with said body.

2. The method of forming a sponge rubber cushion structure for a dished metal seat body comprising cutting blocks from a slab of sponge rubber, the thickness of said blocks determining the depth of the cushion, fitting together and cementing these blocks in juxtaposition upon the seat body to form a layer of cushioning material with cut surfaces of the blocks adhesively contacted with said body, then covering the cushion thus formed with a flexible covering member adhesively secured to the opposite cut surfaces of the blocks of said cushion.

3. The method of forming a sponge rubber cushion structure for a dished metal seat body comprising cutting blocks from a slab of sponge rubber, the thickness of said blocks determining the depth of the cushion, fitting together and cementing these blocks in juxtaposition upon the seat body to form a layer of cushioning material with cut surfaces of the blocks adhesively contacted with said seat body to form a composite block structure, cementing a portion of a flexible covering to the central portion of the cushioned seat, cementing other portions of said covering to the other portions of said composite block structure of the cushion while applying pressure to said covering and stretching the same, and securing the edges of said covering to said seat body.

4. The method of making a sponge rubber cushion for a seat having a dished metal seat body provided with a flexible anchoring strip at its edge comprising forming a rubber cushioning layer on the top of the seat body with an adhesive surface, cementing a portion of a flexible covering to the central portion of said surface with a rubber cement, allowing the cement for the rest of the covering surface to become tacky and then cementing other portions of said covering to other portions of said surface while applying pressure to said covering and stretching the same, and bending the extended edge of said covering about the edge of said anchoring strip and securing it thereto.

5. The method of making a sponge rubber cushion for a seat having a dished metal seat body provided with a flexible anchoring strip extending beyond the edge of said body comprising forming a rubber cushioning layer on the top of the seat body with an adhesive surface, cementing a portion of a flexible covering to the central portion of said surface with a rubber cement, allowing the cement for the rest of the covering surface to become tacky and then cementing other portions of said covering to other portions of said surface while applying pressure to said covering and stretching the same, and bending over the edge of said covering about the extended edge of said anchoring strip and adhesively securing it to the underside of said strip, and stitching the bent over edge of said covering and said strip together.

6. The method of making a sponge rubber cushion for a seat having a dished metal seat body comprising cutting blocks from a slab of sponge rubber, the thickness of said blocks determining the depth of the cushion, fitting together and cementing these blocks upon the seat body to form a layer of cushioning material with cut surfaces of the blocks adhesively contacted with said body, the outer of said blocks extending substantially parallel to the outer edge of said seat body, cementing a portion of a flexible covering to the central portion of the cushioned seat with a rubber cement, allowing the cement for the rest of the covering surface to become tacky and then cementing other portions of said covering to the composite block structure of the cushion while applying pressure to said covering and stretching the same, and securing the edges of said covering to said seat body.

JOSEPH E. BLOOMBERG.